US009164977B2

(12) United States Patent
Byron et al.

(10) Patent No.: US 9,164,977 B2
(45) Date of Patent: Oct. 20, 2015

(54) ERROR CORRECTION IN TABLES USING DISCOVERED FUNCTIONAL DEPENDENCIES

(71) Applicant: International Business Machines Corporation, Armonk, NY (US)

(72) Inventors: Donna K. Byron, Petersham, MA (US); Scott N. Gerard, Wake Forest, NC (US); Alexander Pikovsky, Lexington, MA (US); Timothy P. Winkler, Skokie, IL (US)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 13/925,015

(22) Filed: Jun. 24, 2013

(65) Prior Publication Data
US 2014/0379666 A1 Dec. 25, 2014

(51) Int. Cl.
G06F 17/00 (2006.01)
G06F 17/24 (2006.01)
G06F 17/30 (2006.01)

(52) U.S. Cl.
CPC ............ *G06F 17/245* (2013.01); *G06F 17/246* (2013.01); *G06F 17/30011* (2013.01); *G06F 17/30371* (2013.01)

(58) Field of Classification Search
None
See application file for complete search history.

(56) References Cited

U.S. PATENT DOCUMENTS 4,688,195 A   8/1987   Thompson et al.
5,491,700 A * 2/1996   Wright et al. ................. 714/759
6,161,103 A   12/2000  Rauer et al.
6,904,428 B2  6/2005   Frieder et al.
7,412,510 B2  8/2008   Schweitzer et al.
7,620,665 B1  11/2009  George et al.
7,631,065 B2  12/2009  Schweitzer et al.
7,792,823 B2  9/2010   Cain et al.
7,792,829 B2  9/2010   Brill et al.
8,037,108 B1  10/2011  Chang
8,055,661 B2  11/2011  Lee et al.
8,255,789 B2  8/2012   Berger et al.
8,364,673 B2  1/2013   Chang et al.

(Continued)

FOREIGN PATENT DOCUMENTS

JP        05334490       12/1993
WO        WO 03/012661 A1   3/2003

OTHER PUBLICATIONS

U.S. Appl. No. 14/082,862, 1 page.

(Continued)

*Primary Examiner* — Hung Le
(74) *Attorney, Agent, or Firm* — Stephen J. Walder, Jr.; Jeffrey S. LaBaw

(57) ABSTRACT

Mechanisms are provided for performing tabular data correction in a document. Tabular data is received and analyzed to identify at least one portion of the tabular data having an erroneous/missing data value. A functional dependency of the at least one portion of the tabular data on one or more other portions of the tabular data is determined. A correct data value for the erroneous or missing data value of the at least one portion of the tabular data is determined based on the functional dependency of the at least one portion. In addition, the tabular data is modified to replace the erroneous or missing data value with the correct data value and thereby generate a modified table data. A processing operation is then performed on the modified table data to generate a resulting output.

20 Claims, 10 Drawing Sheets

(56) References Cited

U.S. PATENT DOCUMENTS

| | | | |
|---|---|---|---|
| 8,442,988 B2 | 5/2013 | Draese et al. | |
| 8,719,014 B2* | 5/2014 | Wagner | 704/231 |
| 8,781,989 B2* | 7/2014 | Duchon | 706/52 |
| 8,910,018 B2* | 12/2014 | Huang et al. | 714/763 |
| 2002/0078406 A1 | 6/2002 | Kondoh et al. | |
| 2003/0061030 A1* | 3/2003 | Kuboyama et al. | 704/9 |
| 2003/0097384 A1 | 5/2003 | Hu et al. | |
| 2004/0030687 A1 | 2/2004 | Hidaka et al. | |
| 2004/0103367 A1* | 5/2004 | Riss et al. | 715/506 |
| 2004/0117739 A1 | 6/2004 | Challenger et al. | |
| 2006/0173834 A1 | 8/2006 | Brill et al. | |
| 2007/0011183 A1 | 1/2007 | Langseth et al. | |
| 2008/0027888 A1 | 1/2008 | Azzam et al. | |
| 2008/0208882 A1* | 8/2008 | Zhang et al. | 707/101 |
| 2009/0171999 A1 | 7/2009 | McColl et al. | |
| 2009/0287678 A1 | 11/2009 | Brown et al. | |
| 2010/0050074 A1* | 2/2010 | Nachmani et al. | 715/257 |
| 2010/0280989 A1 | 11/2010 | Mehra et al. | |
| 2010/0281455 A1 | 11/2010 | Anand et al. | |
| 2011/0022550 A1 | 1/2011 | Pennacchiotti et al. | |
| 2011/0060584 A1* | 3/2011 | Ferrucci et al. | 704/9 |
| 2011/0066587 A1 | 3/2011 | Ferrucci et al. | |
| 2011/0125734 A1 | 5/2011 | Duboue et al. | |
| 2011/0126275 A1 | 5/2011 | Anderson et al. | |
| 2011/0320419 A1* | 12/2011 | Johnston et al. | 707/703 |
| 2012/0004905 A1 | 1/2012 | Bobick et al. | |
| 2012/0011115 A1 | 1/2012 | Madhavan et al. | |
| 2012/0191716 A1 | 7/2012 | Omoigui | |
| 2012/0303661 A1 | 11/2012 | Blohm et al. | |
| 2013/0007055 A1 | 1/2013 | Brown et al. | |
| 2013/0018652 A1 | 1/2013 | Ferrucci et al. | |
| 2013/0060774 A1 | 3/2013 | Shepherd et al. | |
| 2013/0066886 A1 | 3/2013 | Bagchi et al. | |
| 2013/0325442 A1* | 12/2013 | Dahlmeier et al. | 704/9 |
| 2014/0122535 A1 | 5/2014 | Scott et al. | |
| 2014/0278358 A1 | 9/2014 | Byron et al. | |
| 2015/0066895 A1 | 3/2015 | Komissarchik et al. | |

OTHER PUBLICATIONS

High, Rob, "The Era of Cognitive Systems: An Inside Look at IBM Watson and How it Works", IBM Corporation, http://ip.com/pdf/redbook/REDP495500.pdf, 2012, 16 pages.

Yuan, Michael J., "Watson and healthcare", IBM developerWorks, IBM Corporation, Apr. 12, 2011, 14 pages.

Byron, et al., "Discovering Relationshops in Tabular Data", filed Nov. 26, 2013, U.S. Appl. No. 14/090,184.

Byron, et al., "Subject-Matter Analysis of Tabular Data", filed Nov. 26, 2013, U.S. Appl. No. 14/090,230.

Byron, et al., "Adapting Tabular Data for Narration", filed Mar. 15, 2013, U.S. Appl. No. 13/838,130.

U.S. Appl. No. 14/492,172, 1 page.

Byron, et al., "Discovering Relationships in Tabular Data", filed Jul. 1, 2013, U.S. Appl. No. 13/932,435.

Byron, et al., "Subject-Matter Analysis of Tabular Data", filed Jul. 18, 2013, U.S. Appl. No. 13/945,259.

U.S. Appl. No. 13/664,144, 1 page.

"About Semantic Table", Semantic Table.org, Bioinformatics and Systems Engineering (BASE) division, RIKEN, http://semantictable.org, accessed on Oct. 25, 2012, 1 page.

"Gleaning Resource Descriptions from Dialects of Languages (GRDDL)", W3C Recommendation, W3C, http://www.w3.org/TR/grddl, Sep. 11, 2007, 17 pages.

"SPARQLMotion Getting Started Guide", TopQuadrant, Inc., http://www.topquadrant.com/products/SPARQLMotion_docs/SPARQLMotion_guide.html, accessed on Oct. 25, 2012, 6 pages.

Golbeck, Jennifer et al., "New Tools for the Semantic Web", Knowledge Engineering and Knowledge Management: Ontologies and the Semantic Web, Lecture Notes in Computer Science, DOI: 10.1007/3-540-45810-7_35, vol. 2473/2002, 2002, 11 pages.

IBM, "Dynamic Model-Extracting Table Widget", IP.com, IPCOM000010243D, Nov. 11, 2002, 7 pages.

Langegger, Andreas et al., "XLWrap—Querying and Integrating Arbitrary Spreadsheets with SPARQL", Proceedings of the 8th International Semantic Web Conference, 2009, Springer-Verlag Berlin, Heidelberg, ISBN: 978-3-642-04929-3, 2009, 16 pages.

Pinto, David, "Table Extraction Using Conditional Random Fields", http://scholarworks.umass.edu/cs_faculty_pubs/76, 2003, Computer Science Department Faculty Publication Series, Paper 76, 9 pages.

Piris, Ruben N., "Extracting Knowledge Bases from Table-Structured Web Resources Applied to the Semantic Based Requirements Engineering Methodology SoftWiki", http://subs.emis.de/LNI/Proceedings/Proceedings176/1008.pdf, 2010, pp. 992-995.

Pivk, Aleksander et al., "From Tables to Frames", http://people.aifb.kit.edu/pci/FromTablesToFramesTech.pdf, Jul. 19, 2004, 1-17.

Tao, Cui et al., "Automatic Hidden-Web Table Interpretation, Conceptualization, and Semantic Annotation", Department of Computer Science, Brigham Young University, Provo, UT 84602, USA, 2009, pp. 1-21.

U.S. Appl. No. 14/834,810, 1 page.

"Apache PDFBox—A Java PDF Library", https://pdfbox.apache.org/, Accessed online Jun. 10, 2015, 2 pages.

"IBM SPSS Statistics", http://www-01.ibm.com/software/analytics/spss/products/statistics/, Accessed online Jun. 10, 2015, 2 pages.

"Microsoft Office", http://office.microsoft.com/en-us/, Accessed online Aug. 21, 2015, 5 pages.

"Natural Language Processing", Wikipedia, http://en.4wikipedia.org/wiki/Natural_language_processing, Accessed online Jun. 10, 2015, 12 pages.

"ODFDOM—The Opendocument API", http://incubator.apache.org/odftoolkit/odfdom/index.html, Accessed online Jun. 10, 2015, 2 pages.

"Oracle Outside in Technology", http://www.oracle.com/us/technologies/embedded1025613.htm, Accessed online Jun. 10, 2015, 2 pages.

"SPSS Text Analytics for Surveys", http://www-01.ibm.com/software/analytics/spss/products/statistics/text-analytics-for-surveys/, Accessed online Jun. 10, 2015, 2 pages.

Bhagavatula, Chandra S., "Learning Semantics of WikiTables", Doctoral Thesis Proposal, Department of Electrical Engineering and Computer Science, Northwestern University, Dec. 9, 2013, 22 pages.

Li, Xiang et al., "Towards Fine-grained Citation Function Classification", Proceedings of Recent Advances in Natural Language Processing, Hissar, Bulgaria, Sep. 7-13, 2013, pp. 402-407.

McCord, M.C. et al., "Deep parsing in Watson", IBM J. Res. & Dev. vol. 56 No. 3/4 Paper 3, May/Jul. 2012, pp. 3:1-3:15.

Oliver, Andrew C. et al., "Apache POI—The Java API for Microsoft Documents", Project News, http://poi.apache.org, May 11, 2015, 2 pages.

Syed, Zareen et al., "Exploiting a Web of Semantic Data for Interpreting Tables", Second Web Science Conference, Apr. 26-27, 2010, http://journal.webscience.org/322/2/websci10_submission_108.pdf, 8 pages.

* cited by examiner

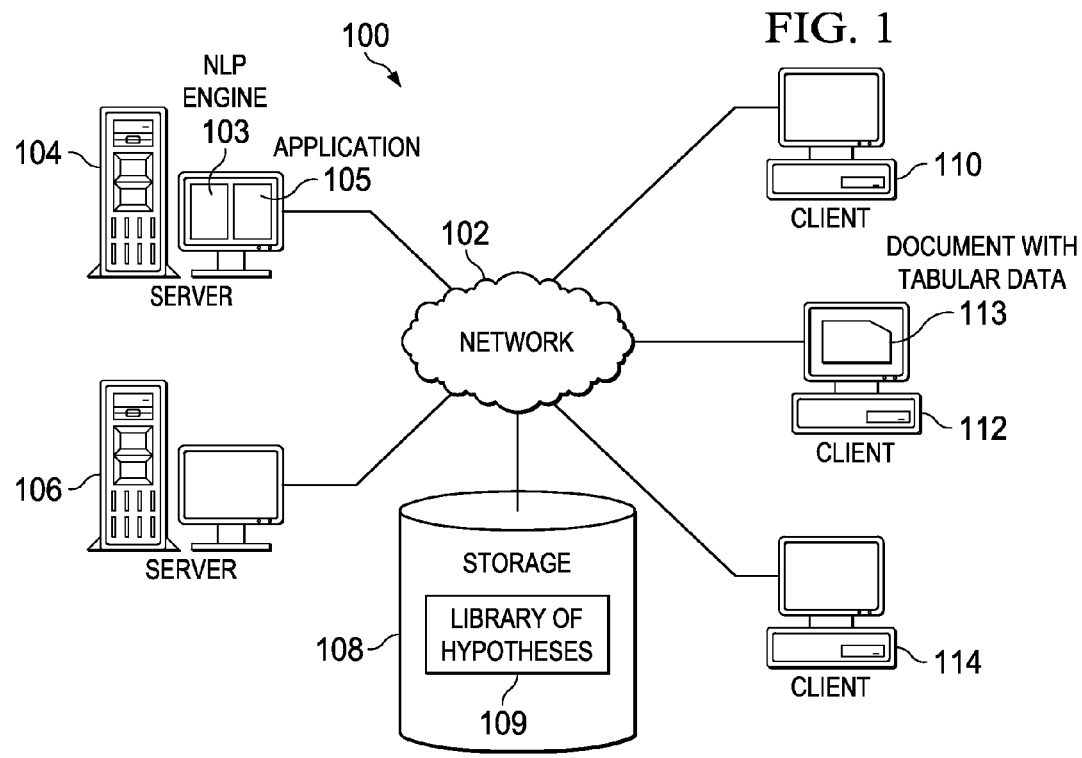
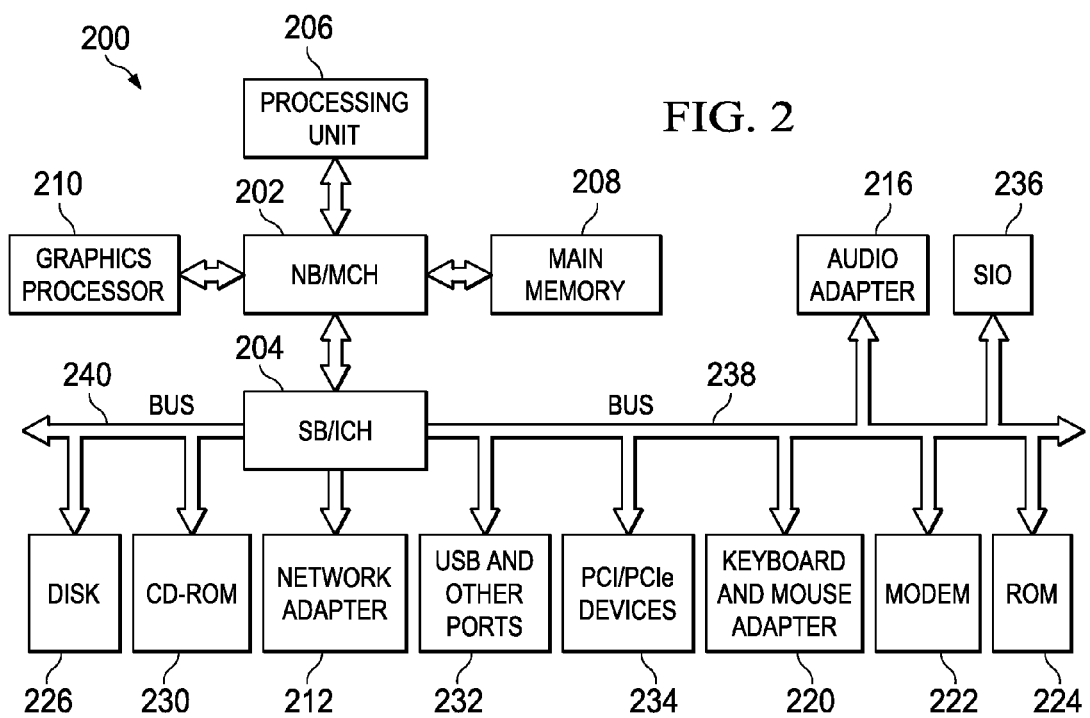

302 FISCAL YEAR ENDED JANUARY 31 304

352 CHANGE 354

| 312 | 2009 306 | 2008 308 | 2007 310 | 2009 vs 2008 356 | | 2008 vs 2007 358 | |
|---|---|---|---|---|---|---|---|
| REVENUES AND NONOPERATING INCOME | | | | | | | |
| 316 { ELECTRIC | $1,899,457 | $1,605,238 | $1,515,746 | $294,219 | 18.3% | $89,492 | 5.9% |
| GAS | 251,884 | 255,439 | 254,340 | (3,555) | -1.4% | 1,099 | 0.4% |
| 318 — TOTAL OPERATING REVENUES | 2,151,341 | 1,860,677 | 1,770,086 | 290,644 | 15.6% | 90,591 | 5.1% |
| 314 — NONOPERATING INCOME, NET | 72,008 | 116,956 | 95,987 | (44,948) | -38.4% | 20,969 | 21.8% |
| 322 — TOTAL REVENUES AND | | | | | | | |
| 320 — NONOPERATING INCOME | 2,223,349 | 1,977,633 | 1,866,073 | 245,716 | 12.4% | 111,560 | 6.0% |
| EXPENSES | | | | | | | |
| OPERATING EXPENSES | | | | | | | |
| FUEL, PURCHASED POWER AND DISTRIBUTION GAS | 899,314 | 701,190 | 659,839 | 198,124 | 28.3% | 41,351 | 6.3% |
| STP OPERATION AND MAINTENANCE | 139,073 | 121,754 | 115,269 | 17,319 | 14.2% | 6,485 | 5.6% |
| CPS ENERGY OPERATION AND MAINTENANCE | 323,874 | 311,437 | 277,619 | 12,437 | 4.0% | 33,818 | 12.2% |
| ANNUAL OPEB COST | 13,054 | 13,377 | 16,145 | (323) | -2.4% | (2,868) | -17.1% |
| REGULATORY ASSESSMENTS | 31,257 | 23,192 | 28,645 | 8,065 | 34.8% | (5,453) | -19.0% |
| DECOMMISSIONING | 21,201 | 25,608 | 25,387 | (4,407) | -17.2% | 221 | 0.9% |
| DEPRECIATION, DEPLETION AND AMORTIZATION | 283,398 | 264,657 | 262,375 | 18,741 | 7.1% | 2,282 | 0.9% |
| TOTAL OPERATING EXPENSES | 1,711,171 | 1,461,215 | 1,385,279 | 249,956 | 17.1% | 75,936 | 5.5% |

(DOLLARS IN THOUSANDS)

FIG. 4A

| | FISCAL YEAR ENDED JANUARY 31 _404_ | | | CHANGE _454_ | | | |
|---|---|---|---|---|---|---|---|
| | 2009 _406_ | 2008 _408_ | 2007 _410_ | 2009 vs 2008 _456_ | | 2008 vs 2007 _458_ | |
| REVENUES AND NONOPERATING INCOME _412_ | | | | | | | |
| ELECTRIC _416_ | $1,899,457 | $1,605,238 | $1,515,746 | $294,219 | 18.3% | $89,492 | 5.9% |
| GAS _418_ | 251,884 | 255,439 | 254,340 | (3,555) | -1.4% | 1,099 | 0.4% |
| TOTAL OPERATING REVENUES _414_ _428_ | 2,151,341 | 1,860,677 | 1,770,086 | 290,644 | 15.6% | 90,591 | 5.1% |
| NONOPERATING INCOME, NET _422_ | 72,008 | 116,956 | 95,987 | (44,948) | -38.4% | 20,969 | 21.8% |
| TOTAL REVENUES AND NONOPERATING INCOME _420_ _430_ | 2,223,349 | 1,977,633 | 1,866,073 | 245,716 | 12.4% | 111,560 | 6.0% |
| EXPENSES _426_ | | | | | | | |
| OPERATING EXPENSES | | | | | | | |
| FUEL, PURCHASED POWER AND DISTRIBUTION GAS | 899,314 | 701,190 | 659,839 | 198,124 | 28.3% | 41,351 | 6.3% |
| STP OPERATION AND MAINTENANCE | 139,073 | 121,754 | 115,269 | 17,319 | 14.2% | 6,485 | 5.6% |
| CPS ENERGY OPERATION AND MAINTENANCE | 323,874 | 311,437 | 277,619 | 12,437 | 4.0% | 33,818 | 12.2% |
| ANNUAL OPEB COST | 13,054 | 13,377 | 16,145 | (323) | -2.4% | - | - |
| REGULATORY ASSESSMENTS | 31,257 | 23,192 | 28,645 | 8,065 | 34.8% | (5,453) | -17.1% |
| DECOMMISSIONING | 21,201 | 25,608 | 25,387 | (4,407) | 17.2% | 221 | 19.0% |
| DEPRECIATION, DEPLETION AND AMORTIZATION | 283,398 | 264,657 | 262,375 | 18,741 | 7.1% | 2,282 | 0.9% |
| TOTAL OPERATING EXPENSES | 1,711,171 | 1,461,215 | 1,385,279 | 249,956 | 17.1% | 75,936 | 5.5% |

400 402 (DOLLARS IN THOUSANDS) 424 452

FIG. 8

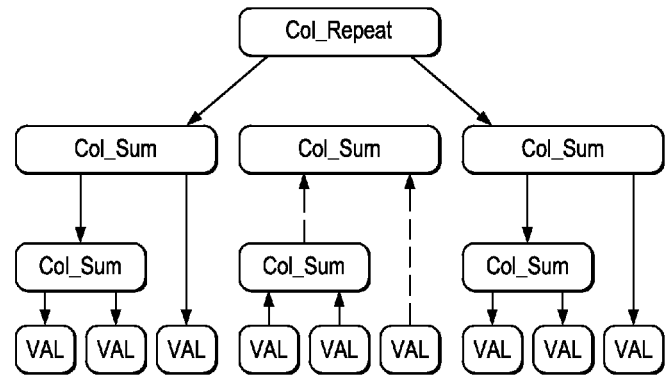

SUMMARY OF REVENUES, EXPENSES AND CHANGES
(DOLLARS IN THOUSANDS)

| | FISCAL YEAR ENDED JANUARY 31 | | |
|---|---|---|---|
| | 2009 | 2008 | 2007 |
| [1] REVENUES AND NONOPERATING INCOME | | | |
| [2] ELECTRIC | $1,899,457 | $1,605,238 | $1,515,746 |
| [3] GAS | 251,884 | 255,439 | 254,340 |
| [4] TOTAL OPERATING REVENUES | 2,151,341 | rei/xz | 1,770,086 |
| [5] NONOPERATING INCOME, NET | 72,008 | 116,956 | 95,987 |
| [6] TOTAL REVENUES AND NONOPERATING INCOME | 2,223,349 | 1,977,633 | 1,866,073 |
| EXPENSES | | | |
| OPERATING EXPENSES | | | |
| FUEL, PURCHASED POWER AND DISTRIBUTION GAS | 899,314 | 701,190 | 659,839 |
| STP OPERATION AND MAINTENANCE | 139,073 | 121,754 | 115,269 |
| CPS ENERGY OPERATION AND MAINTENANCE | 323,874 | 311,437 | 277,619 |
| ANNUAL OPEB COST | 13,054 | 13,377 | 16,145 |
| REGULATORY ASSESSMENTS | 31,257 | 23,192 | 28,645 |
| DECOMMISSIONING | 21,201 | 25,608 | 25,387 |
| DEPRECIATION, DEPLETION AND AMORTIZATION | 283,398 | 264,657 | 262,375 |
| TOTAL OPERATING EXPENSES | 1,711,171 | 1,461,215 | 1,385,279 |

ERROR CORRECTION IN TABLES USING DISCOVERED FUNCTIONAL DEPENDENCIES

BACKGROUND

The present application relates generally to an improved data processing apparatus and method and more specifically to mechanisms for performing error correction in tables using discovered functional dependencies.

Documents include information in many forms. For example, textual information arranged as sentences and paragraphs convey information in a narrative form. However, some types of information are presented in a tabular organization. For example, a document can include tables for presenting financial information, organizational information, and more generally, any data items that are related to one another through some relationship.

Natural language processing (NLP) is a technique that facilitates exchange of information between humans and data processing systems. For example, one branch of NLP pertains to transforming a given content into a human-usable language or form. For example, NLP can accept a document whose content is in a computer-specific language or form, and produce a document whose corresponding content is in a human-readable form.

SUMMARY

In one illustrative embodiment, a method, in a data processing system comprising a processor and a memory, is provided for performing tabular data correction. The method comprises receiving tabular data and analyzing the tabular data to identify at least one portion of the tabular data comprising an erroneous or missing data value. The method further comprises determining, for the at least one portion, a functional dependency of the at least one portion of the tabular data on one or more other portions of the tabular data. Moreover, the method comprises determining for the at least one portion, a correct data value for the erroneous or missing data value of the at least one portion of the tabular data based on the functional dependency of the at least one portion. In addition, the method comprises modifying the tabular data to replace the erroneous or missing data value with the correct data value and thereby generate a modified table data structure. Furthermore, the method comprises performing a processing operation on the modified table data structure to generate a resulting output.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1 depicts a pictorial representation of a network of data processing systems in which illustrative embodiments may be implemented;

FIG. 2 depicts a block diagram of a data processing system in which illustrative embodiments may be implemented;

FIG. 3 depicts an example of tabular data within which functional dependencies can be identified in accordance with an illustrative embodiment;

FIGS. 4A and 4B depict a block diagram of a manner of discovering relationships in tabular data in accordance with an illustrative embodiment;

FIG. 8 is an example diagram of a table structure that may be found in a document processed by a natural language processing system, in which an erroneous data value is present within the table structure;

DETAILED DESCRIPTION

Figure 4B:
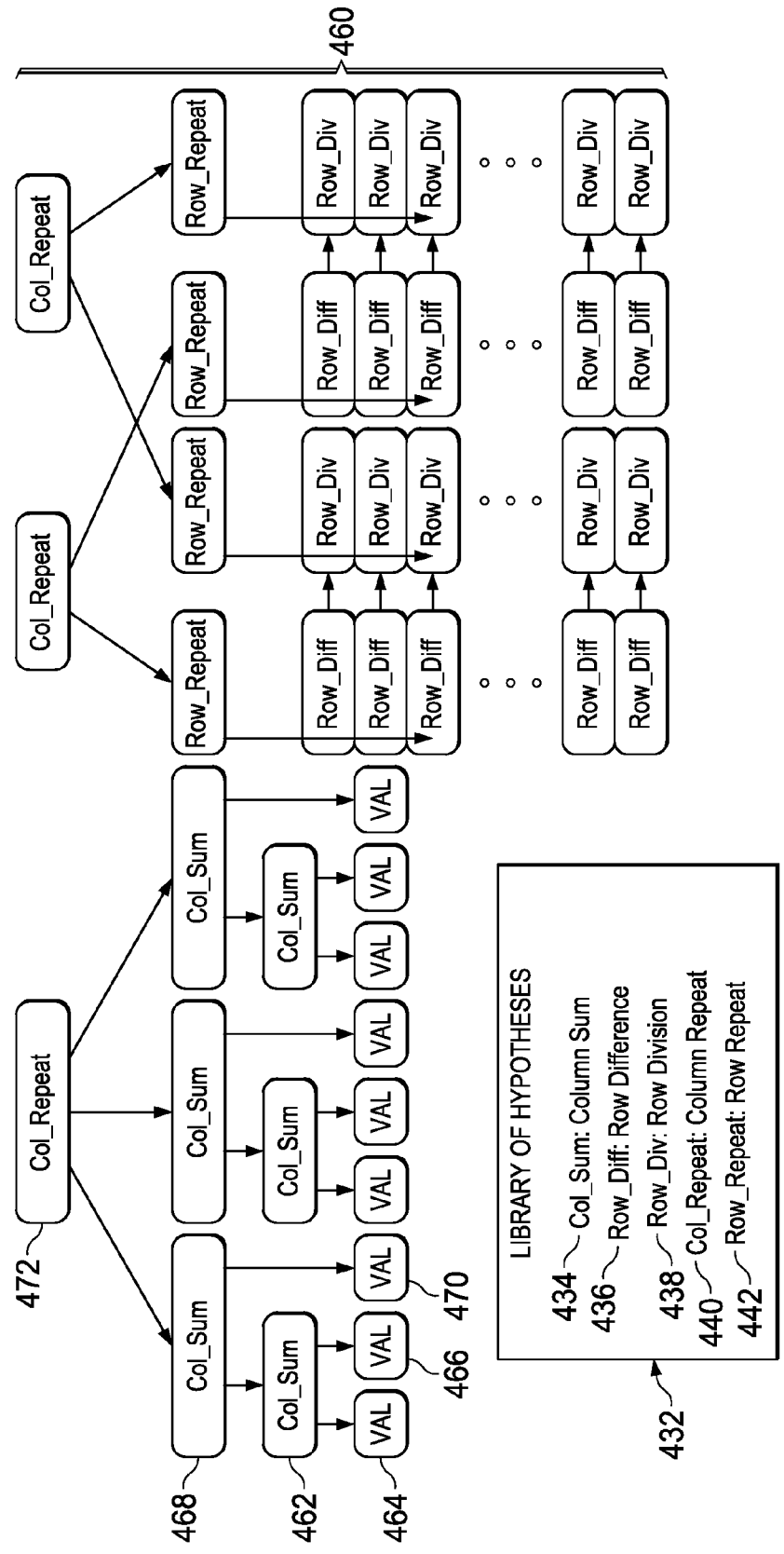

The illustrative embodiments are directed to correcting erroneous or missing values in table data structures using determined discovered functional dependencies within the table data structures between portions of the table data structures or across one or more different table data structures. It should be appreciated that these table data structures may be provided in various formats including as separate table data files or embedded in other data structures, such as documents of a corpus of information, for example.

Moreover, various processing operations may be applied to such table data structures by various applications, algorithms, and the like, or may be the impetus for erroneous or missing data values in table data structures. One such processing operation that may be applied is natural language processing (NLP) of a document that contains a table data structure. Another type of operation that is applied to a document which may result in table data structures having erroneous or missing data values is optical character reading (OCR). Still other types of operations include manual input of table data into an application to generate a table data structure. Any processing operation that may result in, or be applied to, a table data structure may be the focus of the mechanisms of the illustrative embodiments.

For purposes of the following description, it will be assumed that the mechanisms of the illustrative embodiments will be applied to table data structures embedded or otherwise associated with a document in a corpus of information for the purpose of performing natural language processing on the table data structure. However, it should be appreciated that this is only one possible implementation and the mechanisms of the illustrative embodiments are not limited to such. Rather, the scope of the illustrative embodiments of the present invention is intended to encompass any table data structure and any processing operation that may be applied to a corrected table data structure including, but not limited to, table data structures embedded in documents and NLP operations being applied to corrected table data structures.

Using NLP as an example processing operation to be applied to a table data structure, the illustrative embodiments recognize that documents subjected to NLP commonly include tabular data, to wit, content in the form of one or more tabular data structures (tables). A cell of a table is a containing unit within a table, such that the contents of the cell can be uniquely identified by a row and column or other suitable coordinates of the table.

The illustrative embodiments recognize that information presented within the cells of a table often relates to information in other cells of the same table, cells of a different table in the same document, or cells of a different table in a different document. The relationships between the information contained in different cells is important for understanding the meaning of the tabular data, and generally for understanding the meaning of the document as a whole.

The illustrative embodiments recognize that specialized processing or handling is needed in NLP for interpreting the tabular data correctly and completely. Presently available technology for understanding the relationship between cell-values is limited to heuristically guessing a label for a cell using the row or column titles.

Moreover, the illustrative embodiments recognize that tables within electronic documents may contain incorrect or missing information due, for example, to faulty optical character reading (OCR) scan operations, corrupted data, incorrect data entry by human beings, or any other possible source of error. Furthermore, these tables may contain information that is critical for understanding the document in general and thus, it is important to correct the information wherever possible.

The illustrative embodiments used to describe the present invention generally address and solve the above-described problems and other problems related to the limitations of presently available NLP technology with regard to its processing of table information in electronic documents. The illustrative embodiments provide a method, system, and computer program product for discovering relationships in tabular data and for correcting incorrect or missing information in such tabular data based on discovered functional dependencies.

The illustrative embodiments recognize that a cell in a table can depend on one or more other cells in the table, cells across different tables in the given document, or cells across different tables in different documents. The dependency of one cell on another is functional in nature, to wit, dependent based on a function. The functions forming the bases of such functional dependencies can be, for example, any combination of mathematical, statistical, logical, or conditional functions that operate on certain cell-values to impart cell-values in certain other cells. As an example, a cell containing a total amount value is functionally dependent upon the cells whose values participate in the total amount value calculation. As another example, a statistical analysis result cell, such as a cell containing a variance value in an experiment, can be functionally dependent on a set of other cells, perhaps in another table, where the outcomes of the various iterations of the experiment are recorded.

These examples are not intended to be limiting on the illustrative embodiments. Functional dependencies are indicative of relationships between the cells of one or more tables, and are highly configurable depending on the data in a table or document, purpose there for, and the meaning of the various cells. Furthermore, a cell can participate in any number of functional dependencies, both as a dependant cell and/or as a depended-on cell. Because information in a cell can relate to information available anywhere in a given document, a functional dependency of a cell can include depending on non-tabular data in a given document as well.

The illustrative embodiments improve the understanding of the information presented in tabular form in a document by enabling an NLP tool to understand relationships of cells of tabular data. The illustrative embodiments provide a way of determining the functional dependencies of cells in a table on other cells, surrounding text of the table, contents in a document, or a combination thereof. Moreover, the illustrative embodiments provide mechanisms for correcting incorrect data in these cells or completing the data in cells where there is missing data based on the detected or discovered functional dependencies.

With regard to table contents, the term "precision" refers to a measure of how much of what is understood from a table is correct, over how much is understood from the table. The term "recall" refers to a measure of how much is understood from the table, over how much information there actually is to understand in the table. Typically, attempts to improve precision result in degraded recall performance, and vice versa. Illustrative embodiments described herein improve both precision and recall in natural language processing of a document with tabular data.

The illustrative embodiments are described with respect to certain documents and tabular data only as examples. Such documents, tabular data, or their example attributes are not intended to be limiting to the invention. Furthermore, the illustrative embodiments may be implemented with respect to any type of data, data source, or access to a data source over a data network. Any type of data storage device may provide the data to an illustrative embodiment of the present invention, either locally at a data processing system or over a data network, without departing from the spirit and scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, Application 105 in server 104 is an implementation of an embodiment described herein. Application 105 operates in conjunction with Natural Language Processing (NLP) engine 103. NLP engine 103 may be, for example, an existing application capable of performing natural language processing on documents, and may be modified or configured to operate in conjunction with application 105 to perform an operation according to an embodiment described herein. Storage 108 includes library of hypotheses 109 according to an embodiment. Client 112 includes document with tabular data 113 that is processed according to an embodiment.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers. In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 112 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive 226, CD-ROM 230, and other similarly usable devices are some examples of computer usable storage devices including computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on at least one of one or more storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

With reference to FIG. 3, this figure depicts an example of tabular data within which functional dependencies can be identified in accordance with an illustrative embodiment. Table 300 is an example of tabular data appearing in document 113 in FIG. 1 within which functional dependencies can be determined using application 105 in FIG. 1, for example.

The horizontal or vertical rule-lines are depicted for bounding a table and cell only as an example without implying a limitation thereto. A table or tabular data can be expressed in any suitable manner, and a cell can be demarcated in any manner within the scope of the illustrative embodiments. For example, indentation, spacing between cell data, different spacing in tabular and non-tabular content, symbols, graphics, a specific view or perspective to illustrate tabular data, or a combination of these and other example manners of expressing tabular data and cells therein are contemplated within the scope of the illustrative embodiments.

Table 302 is a portion of table 300 and includes several headers that serve to organize the data in the various cells into headings, categories, or classifications (categories). The headers can be row-headers or column headers. The headers are not limited to the table boundaries or extremities within the scope of the illustrative embodiments. For example, a header can be embedded within a table, between cells, such as in the form of a sub-header, for example, to identify a sub-category of tabular data. Such sub-row or sub-column headers are contemplated within the scope of the illustrative embodiments. In one embodiment, certain header information can be specified separately from the corresponding tabular data, such as in a footnote, appendix, another table, or another location in a given document.

For example, header 304 identifies a group of columns, which include data for the broad category of "fiscal year ended January 31." Headers 306, 308, and 310 identify sub-categories of the "fiscal year ended January 31" data, namely, by year for three example years.

Row headers 312 include some clues, both in content and organization, for identifying dependencies between cells. For example, row header 314 is a "total" and is indented under row headers 316 and 318. Similarly, row header 320 is another "total" and is indented under row header 322. The indentations at row headers 314 and 320 are example organizational clues that are useful in understanding the functional relationships between cells in the same row as row headers 314 and 320, and other cells in table 302. The word "total" in row headers 314 and 320 are another example of the content clues usable for determining functional dependencies of cells in their corresponding rows in a similar manner. That is, content clues may provide clues to functional relationships between cells by having terms, functional definitions, equations, or the like, that are identifiable and indicative of the relationships based on the content of the headers/cells themselves. The organizational clues provide clues based on their hierarchical or other organizational relationships with one another.

These example clues are not intended to be limiting on the illustrative embodiments. Many other clues or the content, organizational, or other types, will be conceivable from this disclosure by those of ordinary skill in the art, and the same are contemplated within the scope of the illustrative embodiments. Hereafter, the organizational, content, or other types of clues will be referred to collectively as "clues" for ease and clarity of the following description of the illustrative embodiments.

As can be appreciated, the same clues help understand the information in different cells differently. For example, consider table 352, which is another portion of table 300. Header 354 identifies a group of columns, which include data for the broad category of "Change." Headers 356 and 358 identify sub-categories of the "change" data, in other words, comparisons of two consecutive years, from the three example years of categories 306, 308, and 310.

Row headers 312 impart different meanings to the cells in their corresponding rows in tables 302 and 352. For example, while the "total" according to row header 314 implies a dollar amount of income in the corresponding cells in table 302, the same row header implies a dollar amount change and a percentage change in the corresponding cells in table 352. As in this example table 300, in an embodiment, the clues in one location, such as in row headers 312, can also operate in conjunction with other clues, data, or content in other places, to enable determining the meaning of certain cells in a given tabular data.

With reference to FIGS. 4A and 4B, these figures depict a block diagram of a manner of discovering relationships in tabular data in accordance with an illustrative embodiment. Table 400 is the same as table 300 in FIG. 3. Tables 402, 452 are analogous to tables 302 and 352 respectively in FIG. 3. Column headers 404, 406, 408, and 410 are analogous to headers 304, 306, 308, and 310 respectively in FIG. 3. Row headers 412-422 are analogous to row headers 312-322 respectively in FIG. 3. Similarly, column headers 454, 456 and 458 of table 452 are analogous to headers 354, 356 and 358 respectively in FIG. 3.

As noted with respect to FIG. 3, clues in and around a given tabular data can assist in determining the functional dependencies of a cell. Similarly, markups in a given table can also form additional clues and assist in that determination, reinforce a previous determination, or both. For example, lines 424 and 426 are example table markups that act as additional clues in determining functional dependencies of some cells. As noted above, lines or other notations for expressing a table or cell demarcation are only examples, and not intended to be limiting on the illustrative embodiments. Tables and cells can be expressed without the use of express aids, such as lines 424 and 426, within the scope of the illustrative embodiments.

As an example, row header 414 indicates that cell 428 contains a total or summation of some values presented elsewhere, perhaps in table 402. In other words, a clue in header 414 helps determine a functional dependency of type "sum" of cell 428 on some other cells.

Line 424 reinforces this determination, and helps narrow a range of cells that might be participating in this functional dependency. For example, an embodiment concludes that contents of cell 428 are a total, or sum, of the cell values appearing above line 424 up to another delimiter, such as another line, table boundary, or the like.

As another example, row header 420 indicates that cell 430 contains a total or summation of some values presented elsewhere, perhaps in table 402. In other words, a clue in header 420 helps either determine or confirm a hypothesis of a functional dependency of type "sum" of cell 430 on some other cells.

Line 426 reinforces this determination, and helps narrow a range of cells that might be participating in this functional dependency. For example, an embodiment concludes that contents of cell 430 are a total, or sum, of the cell values appearing above line 426 up to another delimiter, such as another line, e.g., line 424.

Lines 424 and 426 are described as example structural markups or clues only for clarity of the description and not as a limitation on the illustrative embodiments. Another example markup that can similarly assist in determining functional relationships between cells is a semantic clue, such as compatible row and column type. For example, when a row header of a cell indicates a revenue value and the column header of a cell indicates a year, it is likely that the cell in that row and column at least includes a revenue value in that year, and perhaps is related to certain other values in the same column by a sub-total type functional relationship. In this example, a clue relates to a specific cell. Such a cell-specific clue is useful in confirming a functional dependency for that cell, and may or may not be usable for confirming similar functional dependency across the whole column.

As another example, the presence of a common header 404 hints at a commonality in columns 406, 408, and 410. Separately, an embodiment can conclude that the content of headers 406, 408 and 410 all have semantic type "Year." The embodiment determines a hint that these three columns are similar. When the embodiment finds that the same functional dependencies hold in those three columns, the embodiment assesses a confidence level in that finding using the fact that this hint or clue supports the confidence level. A hint as described above is a column-wide hint. A hypothesis that a dependency holds over a number of columns is a column-wide hypothesis. A column-wide hint is useful in supporting a column-wide hypothesis.

An embodiment uses some of the available markups or clues in and around the table to hypothesize a functional dependency. An embodiment further uses other available clues or markups to confirm the hypothesis, thereby improving a confidence level in the hypothesis. Essentially, a hypothesis is a framework of a functional dependency—a hypothetical relationship between hypothetical cells—which when applied to an actual table and constituent cells can be true or false for all cases where applied, or sometimes true and sometimes false.

A hypothesis is confirmed or supported, or in other words, confidence in a hypothesis is above a threshold, if clues or markups support an instance where the functional dependency according to the hypothesis yields a correct result. Confidence in a hypothesis is also increased from one value to another, such as from below a threshold level of confidence to above the threshold level of confidence, if the functional dependency according to the clue can be replicated at other cells or cell-ranges in the given tabular data (i.e., a clue holds true, or supports the hypothesis).

In machine learning terms each clue in a set of all possible supporting clues is called a "feature." Presence or absence of a feature for an existing hypothesis increase or decrease the confidence level in that hypothesis. A "model" according to an embodiment is a mechanism to compute the confidence score for a hypothesis based on a subset of features that are present (or support) the hypothesis. In one embodiment, the model operates as a rule-based engine. In another embodiment, the model is 'trainable' by using a training set of tables for which confidence score is known a priori (i.e., a "labeled set").

Library of hypotheses 432 is analogous to library of hypotheses 109 in FIG. 1. Library of hypotheses 432 is a collection of hypotheses that an embodiment, such as in application 105 in FIG. 1, receives for determining functional dependencies in table 400. In one embodiment, a user supplies library of hypotheses 432. In another embodiment, an application provides library of hypotheses 432. In one embodiment, library of hypotheses 432 is a part of a larger library of hypotheses (not shown), and is selected according to some criteria. An example criterion for selecting the member hypotheses of library of hypotheses 432 can be domain-specificity. For example, library of hypotheses 432 may include only those hypotheses that are applicable to the domain of the tabular data being analyzed. Constituent hypotheses in library of hypotheses 432 can be changed as the tabular data changes.

In example library of hypotheses 432 as depicted, hypothesis 434 hypothesizes that some cells are a sum of some other cells in the same column, i.e., are "column sums," or "col_sum." Similarly, hypothesis 436 hypothesizes that some cells are a difference between certain other cells in the same row, i.e., are "row difference," or "row_diff." Hypothesis 438 hypothesizes that some cells are a division of certain other cell in the same row with another cell in the same row or a constant, i.e., are "row division," or "row_div."

Hypothesis 440 hypothesizes that some hypotheses repeat in different columns, i.e., are "column repeat," or "col_repeat." For example, "column sum" hypothesis 434 can repeat in column 406, and in columns 408 and 410. Similarly, hypothesis 442 hypothesizes that some hypotheses repeat in different rows, i.e., are "row repeat," or "row_repeat." For example, "row difference" hypothesis 436 can repeat in row 416, and in rows 418 and 414. Applicability of one hypothesis can boost the confidence in applicability of another hypothesis in this manner. In other words, if hypothesis 434 seems to indicate functional dependency between certain cells, and hypothesis 440 seems to validate the applicability of hypothesis 434 across more than one columns, an embodiment exhibits higher than a threshold level of confidence in the functional dependency indicated by hypothesis 434.

Graph 460 shows the various example hypotheses in library of hypotheses 432 in operation on table 400. For example, at element 462 in graph 460, hypothesis col_sum appears to apply to a set of values bound between lines 424 and the beginning of data in table 402, i.e., elements 464 and 466 in graph 460, and results in the value in cell 428. Similarly, at element 468, hypothesis col_sum also appears to apply to the cells between lines 424 and 426, one of which is a result of a previous application of the same hypothesis at element 462, and the other is element 470, and results in the value in cell 430. Element 472 in graph 460 indicates that the arrangement of elements 462, 464, 466, 468, and 470 repeats according to hypothesis 440 in columns 408 and 410 in table 402. Remainder of graph 460 similarly determines the functional dependencies in table 452.

Thus, in the example depicted in FIGS. 4A and 4B, the examples of determined dependencies indicate repeatable patterns and are validated by the supporting computation on the cells involved. Given a suitable threshold level, an embodiment can express a confidence level that exceeds the threshold level. Accordingly, the embodiment outputs a natural language processed form of the cells of table 400 whereby the cell values are expressed not only reference to their denominations or headers, but also by their inter-relationships.

For example, the value in cell 428 would be expressed not only as "two million, one hundred fifty one thousand, three hundred and forty one dollars of total revenues and non-operating income in 2009" but also as "a total of the income in electric and gas categories of the revenues and non-operating income in the year 2009." Such natural language processing with the benefit of an embodiment is far more useful and informative than what can be produced from the presently available NLP technology.

Figure 5:
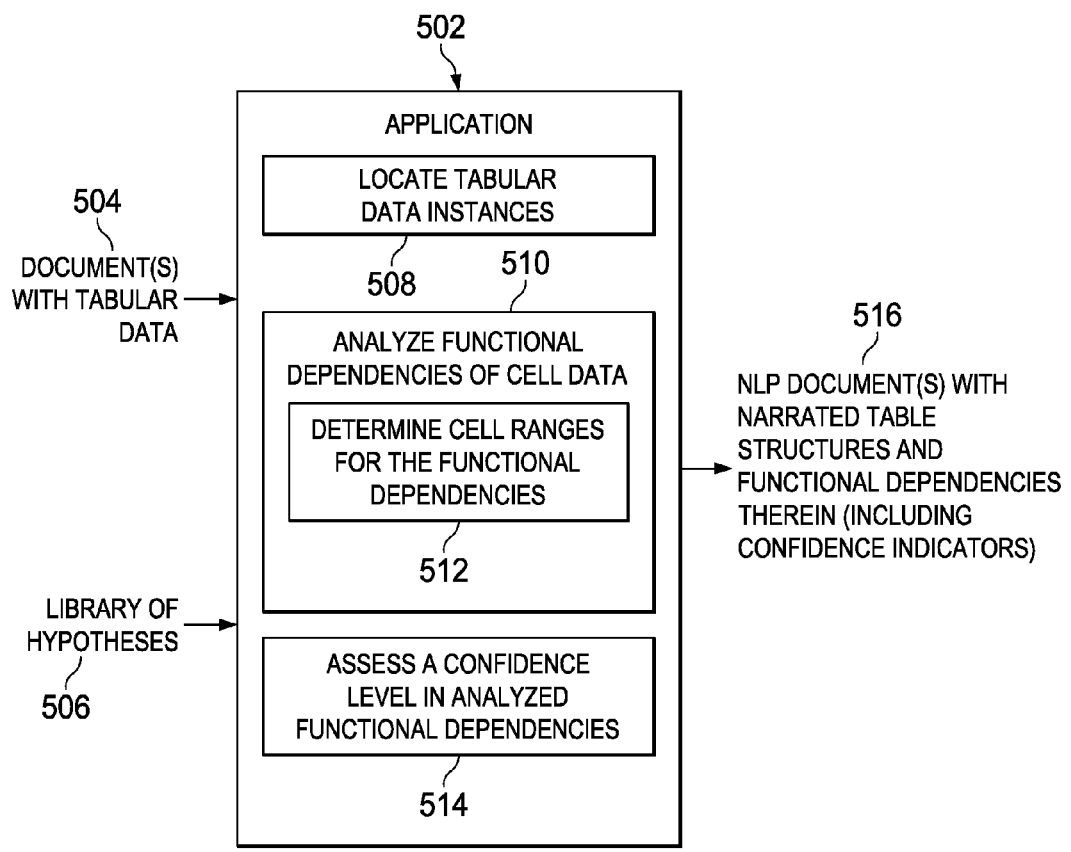
FIG. 5 depicts a block diagram of an application for discovering relationships in tabular data in accordance with an illustrative embodiment.

With reference to FIG. 5, this figure depicts a block diagram of an application for discovering relationships in tabular data in accordance with an illustrative embodiment. Application 502 can be used in place of application 105 in FIG. 1. Application 502 receives as inputs 504 and 506, one or more documents with tabular data, and a library of hypotheses, respectively. Application 502 includes functionality 508 to locate instances of tabular data in input 504. Using library of hypotheses 506 functionality 510 analyzes the functional dependencies of cell data in an instance of tabular data located by functionality 508 in input 504.

In performing the analysis, functionality 510 uses functionality 512 to determine cell-ranges participating in a given functional dependency. Some example ways of determining cell-ranges using clues and markups are described in this disclosure.

Functionality 514 assesses a confidence level in a functional dependency analyzed by functionality 510. Functionality 510, 512, and 514 operate on as many cells in as many table instances as needed in a given implementation without limitation. Application 502 outputs one or more NLP documents 516, with table structures and functional dependencies identified therein, optionally including any suitable manner of indicating confidence levels in one or more such functional dependencies.

Figure 6:
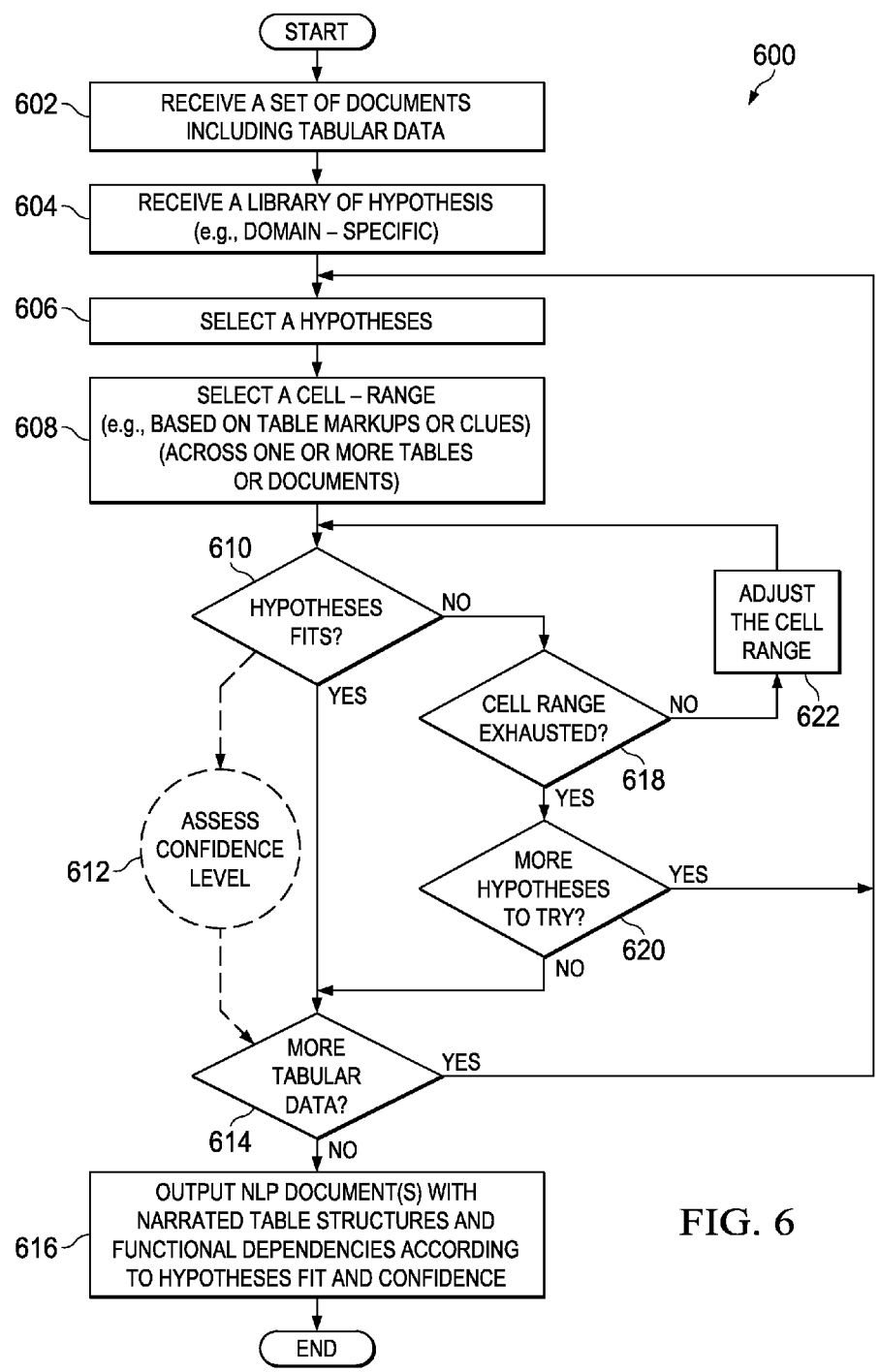
FIG. 6 depicts a flowchart of an example process for discovering relationships in tabular data in accordance with an illustrative embodiment.

With reference to FIG. 6, this figure depicts a flowchart of an example process for discovering relationships in tabular data in accordance with an illustrative embodiment. Process 600 can be implemented in application 502 in FIG. 5. Process 600 begins by receiving a set of one or more documents that include tabular data (step 602). Process 600 receives a library of hypotheses (step 604). For example, the library of hypotheses can be limited to include only those hypotheses that are applicable to the subject-matter domain of the documents received in step 602.

The complexity of finding functional dependencies increases exponentially with the size of table being analyzed and the number of hypotheses in a given library of hypotheses. Thus, an embodiment optimizes the detection of functional dependencies by limiting the number or types of hypotheses in a given library of hypotheses, limiting the cell-ranges to search for functional dependencies, or a combination thereof.

Process 600 selects a hypothesis from the library of hypotheses (step 606). Process 600 selects a cell-range, such as by using clues, markups, or variations thereof, in some combination of one or more such clues, markups, or variations, across one or more tables or surrounding contents in one or more documents (step 608). Process 600 determines whether the selected hypothesis fits the selected cell-range (step 610). For example, as described with respect to FIGS. 4A and 4B, process 600 may determine whether a cell in question computes as a column sum from a cell-range bound by certain markups above that cell. This example way of determining whether the selected hypothesis fits is not intended to be limiting on the illustrative embodiments. Because the hypothesis being used can be any suitable hypothesis according to the documents being analyzed, any suitable manner of determining whether the hypothesis is satisfied can be used within the scope of process 600.

If the selected hypothesis fits the selected cell-range ("Yes" path of step 610), process 600 proceeds to step 614. In one embodiment, after determining that a collection of clues support a hypothesis, process 600 assesses a confidence level in the functional dependency according to the hypothesis (block 612). An embodiment implements block 612 separately from process 600, and performs the confidence level assessment separately from process 600, such as in a different iteration, pass, or process. An embodiment of block 612 is described as process 700 in FIG. 7.

Process 600 determines whether more tabular data has to be analyzed to determine functional dependencies of cells (step 614). If more tabular data has to be analyzed ("Yes" path of step 614), process 600 returns to step 606. If no more tabular data is to be analyzed ("No" path of step 614), process 600 outputs one or more NLP documents, with table structures and functional dependencies according to the hypotheses-fit and confidence (step 616). Process 600 ends thereafter. In one embodiment, process 600 outputs table structures and functional dependencies data according to the hypotheses-fit and confidence, for use in an existing NLP engine, such as NLP engine 103 in FIG. 1, which produces the NLP document.

At step 610, if process 600 determines that the selected hypothesis does not suitably fit the selected cell-range ("No" path go step 610), process 600 determines whether the cell-range has been exhausted for the selected hypothesis (step 618). For example, if the selected hypothesis is a "column sum" and the cell-range above the cell being evaluated has been reduced to zero cells, the cell-range would be exhausted for that hypothesis. Cell-range exhaustion is a hypothesis-dependent concept, and can be determined in any suitable manner according to the hypothesis being considered.

If the cell-range has been exhausted ("Yes" path of step 618), process 600 determines whether more hypotheses remain to be tried for the cell whose function dependency is being analyzed (step 620). If one or more hypotheses can be tried ("Yes" path of step 620), process 600 returns to step 606. If no more hypotheses are to be tried ("No" path of step 620), process 600 proceeds to step 614.

If a cell-range has not been exhausted ("No" path of step 618), process 600 adjusts the cell range, such as by increasing the number of cells in the range, decreasing the number of cells in the range, changing to a different range of cells, or a combination of these and other possible changes (step 622). Process 600 then returns to step 610.

Figure 7:
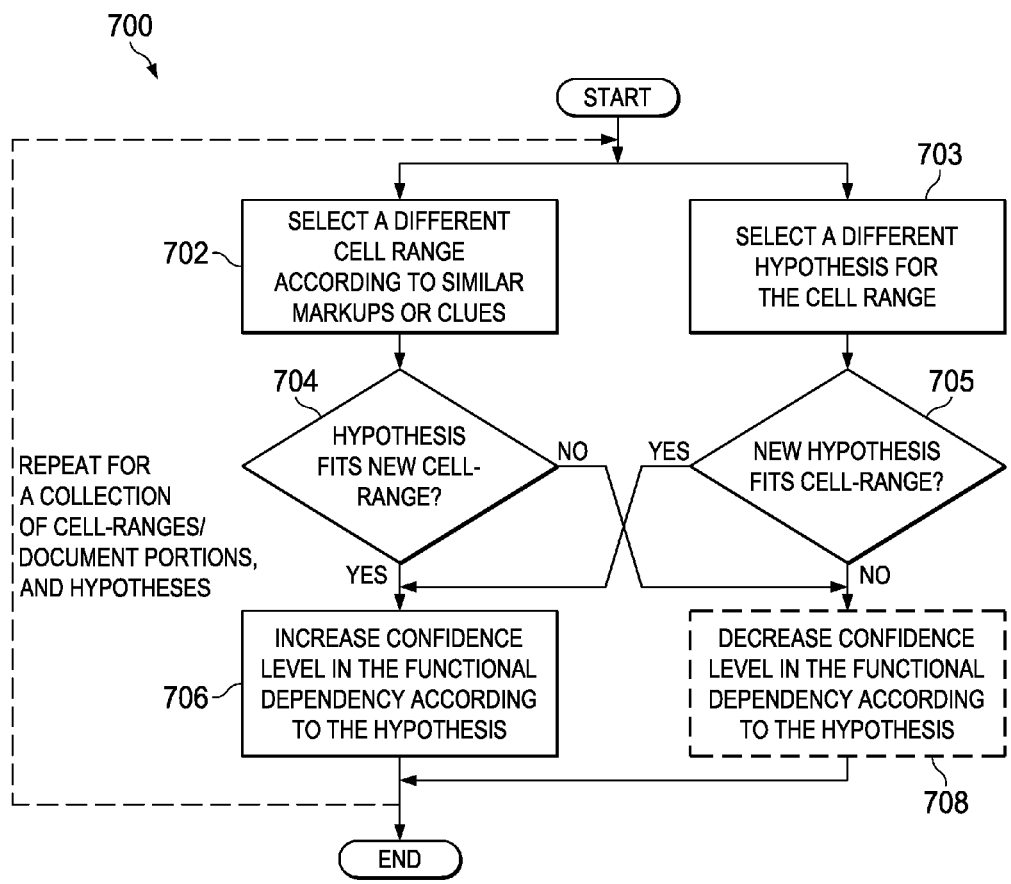
FIG. 7 depicts a flowchart of an example process for assessing a confidence level in accordance with an illustrative embodiment.

With reference to FIG. 7, this figure depicts a flowchart of an example process for assessing a confidence level in accordance with an illustrative embodiment. Process 700 can be implemented as block 612 in FIG. 6. One branch of process 700 begins by selecting a different cell-range according to similar markups or clues (step 702). For example, in one embodiment, process 700 selects comparable cell-ranges in different columns or rows having similarly purposed data. In another embodiment, process 700 considers (not shown) other semantic clues, structural clues, denominations and type compatibilities among cells, suggestive words or phrases such as "total" or "sub-total", or a combination of these and other aids to select a different cell-range to verify a fit for the selected hypothesis.

In other words, for a cell-range and a hypothesis that is true for that range an embodiment searches for a set of supporting clues (features). That set of supporting clues may include not only markups or semantic clues, but also other hypotheses that were found true on that cell-range. The embodiment thus finds a collection of supporting evidence for that hypothesis on that cell-range. The embodiment then computes a total confidence score based on the collection of supporting evidence.

Process 700 determines whether the hypothesis (a primary hypothesis) fits the new cell-range selected in step 702 (step 704). If the hypothesis fits the new cell-range ("Yes" Path of step 704), process 700 increases the confidence level in the functional dependency according to the hypothesis (step 706). Process 700 ends thereafter. If the hypothesis does not fit the new cell-range ("No" path of step 704), process 700 may end or repeat thereafter, leaving the confidence level unchanged, or may decrease the level of confidence (step 708). For example, the value of a feature can be positive, zero or negative. For example, if there is no common header across three example columns, the value of the corresponding feature might be zero—that is, neutral. However, if the three columns have different semantic types, that feature will likely be negative thereby actually decreasing the confidence.

Another branch of process 700 begins by selecting a different hypothesis (a secondary hypothesis) fits the cell-range where another hypothesis (the primary hypothesis already fits), (step 703). Process 700 determines whether the other hypothesis—the secondary hypothesis—fits the cell-range (step 705). If the secondary hypothesis fits the cell-range ("Yes" Path of step 705), process 700 increases the confidence level in the functional dependency according to the hypothesis at step 706. Process 700 may end thereafter. If the secondary hypothesis does not fit the cell-range ("No" path of step 705), process 700 may end or repeat thereafter, leaving the confidence level unchanged, or may decrease the level of confidence at step 708.

When process 700 repeats, process 700 repeats for different cell-ranges and different secondary hypotheses in a similar manner. A repeat iteration evaluates different hypotheses across different ranges and found results. A secondary hypotheses may not apply to a cell-range initially, but, as more dependencies are discovered, the secondary hypotheses (and other higher-order hypotheses)(not shown) may start matching other cell-ranges and supporting other found results. Such matches or support may in-turn trigger testing other hypotheses, and so on (not shown).

During the confidence assessment phase an embodiment attempts to create a collection of various "features" that might increase the confidence level in a functional dependency. An embodiment regards the presence of second-order dependencies, as indicated by a secondary hypothesis fit (misfit), as yet another confidence-increasing (decreasing) feature. Applicability across cell-ranges is depicted in described in the several embodiments only as examples, without implying a limitation thereto. A feature set considered for confidence-level change is not limited only to range-similarity, but may be derived from many other characteristics of tabular data usable as clues, such as including but not limited to various markup clues, layout clues (i.e. common category header), semantic clues (i.e. all headers have the same semantic type (i.e. 'Year'), and derived discovered dependencies like similar dependency in multiple rows.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for discovering relationships in tabular data. An embodiment uses a library of hypotheses to test whether portions of a given tabular data have a particular structure and functional dependency. A hypothesis is tested for one or more cell-ranges to determine whether an outcome of the hypothesis is supported by computations using the selected cell-ranges. A confidence level is associated with the functional dependency within the cell-range according to the hypothesis. The cell-ranges are selected based on a plurality of criteria including variety of clues and markups in the tabular data, content surrounding the tabular data or elsewhere in the given set of documents.

Clues and hypothesis confirmations are described using cell-ranges in some embodiments only as examples and not to imply a limitation thereto. Information, clues, or features, to support selecting a particular hypothesis can come from any portion of a given document, including content other than tabular data in the document, within the scope of the illustrative embodiments.

Some embodiments are described with respect to pre-determined hypotheses or known functions only as examples and not to imply a limitation on the illustrative embodiments. An embodiment can also hypothesize a previously unknown or un-programmed functional dependency, in the form of a learned function. For example, an embodiment may apply some analytical technique on data in a given table and find a statistical data pattern in the tabular data. The embodiment can be configured to account for such findings in the form of a learned function or learned hypothesis within the scope of the illustrative embodiments. The embodiment can then include the learned hypothesis into the collection for further validation or confidence level assessment.

The description of the examples and embodiments described herein are described with respect to clues, hypotheses, documents, tabular data, and NLP in English language is not intended to be limiting on the illustrative embodiments. An embodiment can be implemented in a similar manner using clues, hypotheses, documents, tabular data, and NLP in any language within the scope of the illustrative embodiments.

The above description illustrates the functionality of the present invention, in various embodiments, to identify functional relationships or dependencies between cells in tabular information of one or more documents during natural language processing of the one or more documents. The functional dependencies may be determined from within a single table structure of a single document, from across multiple table structures in a single document, or from across multiple table structures of multiple documents. The discovered functional dependencies may be utilized when performing natural language processing processes, such as may be used for various purposes. One such purpose is to utilize natural language processing as part of a Question and Answer (QA) system, such as the Watson™ QA system available from International Business Machines Corporation of Armonk, N.Y. For example, the discovered functional dependencies may be utilized by such a QA system when performing annotation operations for annotating documents of a corpus for later use in performing question answering operations.

In addition to the above, the illustrative embodiments further provide mechanisms for correcting incorrect information in table structures of documents or supplementing such table structures with information that might be missing from the table structures. That is, as mentioned above, information in table structures of documents may be incorrect or missing due to many different reasons including errors in optical character reading (OCR) operations, data corruption, user error when performing data entry, or the like. However, these table structures may contain information that is critical for understanding the document in general and thus, it is important to correct the information or provide the missing information whenever possible. The illustrative embodiments provide mechanisms for doing just that based on the identified functional dependencies between cells of the table structure discovered using the mechanisms previously described, or similar functional dependency discovery mechanisms.

With this additional capability of the illustrative embodiments, given a table structure, in a document, which contains an erroneous or missing value in a cell of the table structure, with that cell participating in a discovered functional dependency, the illustrative embodiments correct or generate the value in the cell by inverting the functional dependency for the erroneous cell. That is, from the discovered functional dependency structure discovered using the mechanisms previously described, the illustrative embodiments infer a sub-structure of a portion of the table which contains the incorrect or missing data values as conforming with the larger structure. Then, using this known relationship between individual cells, the illustrative embodiments compute the correct value for the cell so as to properly complete the conforming functional dependency structure.

This additional capability of the illustrative embodiments further augments the discovery of functional dependencies by providing mechanisms for identifying erroneous cells in a table structure and then, having identified them, using the discovered functional dependencies to correct the erroneous cells, where an erroneous cell is a cell that either stores an incorrect data value or has a missing data value. Moreover, in some illustrative embodiments, rather than actually correcting an erroneous or missing data value in a table structure based on the discovered functional dependencies, operations may be invoked to alert a human user of the erroneous or missing data value indicating the nature of the error in the data value, e.g., a cell requiring a date value instead has a floating point value or the data value is simply missing, and suggesting a correct data value for replacing the erroneous or missing data value and providing the user with the option to accept or reject the suggested correct data value. If the user accepts the correct data value, then the table structure may be automatically updated. If the user rejects the correct data value, then the table structure may not be updated and the user may or may not instead specify a different data value to replace the erroneous or missing data value.

In order to identify erroneous cells, various algorithms and heuristics may be employed. For example, in one illustrative embodiment, a block of cells may be predefined, e.g., a certain number of columns and rows in the table structure may be specified, and the block of cells may be analyzed to determine if they have a regular structure, e.g., a repeatable pattern, defined or discovered dependency relationship, or the like. If the block of cells has a regular structure, the block of cells may be further analyzed to determine if one or more of the cells in the block of cells does not match the regular structure. For example, if a block of cells corresponds to a listing of numerical values, and a cell comprises an alphabetical entry, such as a word, string of letters, or the like, then the cell may be determined to be not in conformance with the regular structure of the block of cells. As another example, if a block of cells corresponds to a listing of dates, and a cell in the block comprises a floating point number, then it may be determined that that cell is suspicious of being erroneous because it does not appear to be in conformance with the regular structure of the block of cells.

The identification of cells that are suspicious of being erroneous may make use of various table formatting hints, such as column headers, row headers, cell formulas, and the like, to assist in identifying the regular structure of the block of cells and determining those cells that do not fit with the identified regular structure. Moreover, various artificial intelligence and machine learning methods may be employed to assist in identifying suspicious cells within the table structure. For example, features extracted during natural language processing of a document and the table structure, such as markup language information, layout information, functional clues, and the like, may be used to infer functional dependencies within the table structure. This facilitates training and using machine learning models which can then be used to signal the presence of a functional dependency within a table structure. The presence of erroneous or missing data values within the table structure may be performed by identifying portions of the table structure that break the functional dependencies identified by the machine learning models.

For example, the mechanism described previously for identifying functional dependencies between cells may be used to identify the functional dependency of a cell within a block of cells by looking at the information that is able to be gathered from other cells, headers, the title of the table, and other information about the content and structure of the table. For example, an arithmetic dependency (e.g., sum, product, unit conversion, ratio, etc.) or known enumerations (e.g., days of the week, months of the year, time of day, etc.) may be identified for the cell by looking at the cells around the cell in question, the headers of columns/rows, the title of the table, formulas associated with cells, and the like. If a functional pattern is identified to be true for other column and/or row dependencies in the cell block, except for the row/column containing the cell, or the cell itself, then this cell is likely to be storing an erroneous data value or a missing data value, and thus is a suspicious cell whose data value needs to be corrected or otherwise provided.

The identification of suspicious cells within blocks of cells may be repeated for each block of cells in a table structure. Thus, a single block of cells may have zero or more suspicious cells, and a table structure may have multiple blocks of cells with each block of cells having zero or more suspicious cells identified within them.

Having identified a suspicious cell within a block of cells using the mechanisms described above, functional dependencies associated with that cell are identified and inverted to compute a correct data value for the suspicious cell. Thus, for example, if the functional dependency is that the suspicious cell having data value A is one of 4 input values A, B, C, and D to a sum operation, e.g., SUM=A+B+C+D, then the correct data value for the suspicious cell may be computed by inverting the functional dependency such that the correct data value for A is the subtraction of B, C, and D from the SUM, i.e. A=SUM−B−C−D. The determination of the functional dependency itself may be obtained from the detection of functional dependencies previously described, e.g., identifying that the header of a column is a "total" of monthly expenses and other columns specify particular "months" of the year, and/or that the column header of the present cell is a particular month name, then it can be deduced that the functional dependency of the suspicious cell is a monthly expense value that has a functional relationship with a corresponding cell in the "total" column being an input to the summation function for generating the total data value in the "total" column. Once determined, however, the functional dependency is inverted as necessary such that the particular data value for the suspicious cell can be calculated.

The errors in suspicious cells of a table structure that may be corrected using the mechanisms of the illustrative embodiments for identifying suspicious cells and inversing determined functional dependencies to generate correct data values for the suspicious cells, fall into a number of different categories. One type of error is the case in which the erroneous value belongs to a suspicious cell ("Cell") that is the output of a discovered functional dependency, e.g., Cell=f(C1, . . . , Cn), where f( ) is a function of other cell data values C1, . . . , Cn. In such a case, the correct data value for the suspicious cell can be calculated directly from the function and its argument cell data values C1, . . . , Cn. Thus, if the value of Cell is erroneous, calculating the value of f(C1, . . . , Cn) gives the correct data value for Cell since both the function and the argument cell data values are known.

A second type of error that may be corrected using the illustrative embodiments is when the erroneous cell data value is one of the inputs of a determined functional dependency that can be inverted, e.g., Output=f( . . . , Cell, . . . ), where Output is the determined functional dependency, f( ) is a function of one or more argument cell data values, and the erroneous cell data value Cell is one of the argument cell data values for the function f( ). In such a case, the determined functional dependency may be inverted to determined the correct data value for the erroneous cell, e.g., Cell=inverse (F, Output, . . . ). Logic may be provided in the mechanisms of the illustrative embodiments for inverting various known functional dependencies such that if an erroneous cell data value is determined to be an input to a determined functional dependency, the corresponding logic for the determined functional dependency may be invoked to invert the functional dependency and calculate the erroneous data value.

A third type of error that may be corrected using the illustrative embodiments, is when the erroneous cell data value is one of the inputs of a determined functional dependency that cannot be inverted, e.g., a closed formula. In such a case, the erroneous cell data value may be approximated by an iterative procedure, such as the Newton-Raphson, interval bisection procedure, or other suitable iterative procedure, for example. For example, a procedure such as outlined in the following pseudo-code may be performed:

```
BadLow = 0
BadHigh = Max(all good parameters)*10
OutputLow = f(..., BadLow,...)
OutputHigh = f(...,BadHigh,...)
while (BadHigh − Badlow > threshold) {
    BadMid = (BadHigh + BadLow)/2
    OutputMid = f(...,BadMid,...)
    if (Output is between OutputLow and OutputMid) {
        BadHigh = BadMid
    } else {
        BadLow = BadMid
    }
}
CorrectedValue = (BadHigh + BadLow)/2
```

Where BadLow is a lower range value for a range of data values for the "bad" cell, i.e. the cell having the erroneous data value, and BadHigh is a upper range value for a range of data values for the bad cell. The functional dependency Output has a corresponding low (OutputLow) and high (OutputHigh) value which are functions of the BadLow and BadHigh values. This range is bisected in an iterative manner as shown by the "while" loop by calculated a middle value in the range from BadLow to BadHigh and a corresponding Output value (OutputMid) for this middle range value. This OutputMid value is used as an upper bound for determining if the actual functional dependency output data value Output is between the OutputLow threshold and this OutputMid value. If so, then the range is adjusted such that the BadHigh value is equal to the BadMid value, otherwise the BadLow value is set equal to the BadMid value. At some point the difference in BadHigh and BadLow is below the threshold in which case the corrected data value for the erroneous cell is approximated to be the average of the BadHigh and BadLow values.

FIG. 8 is an example diagram of a portion of a table structure that may be found in a document processed by a natural language processing system, in which an erroneous data value is present within the table structure. In the example shown in FIG. 8, the portion of the tabular data in the document being processed includes a summary of revenues, expenses and changes that includes a plurality of columns for different calendar years 2007-2009 and rows corresponding to different categories of revenues and expenses.

As can be seen from FIG. 8, each of the columns follows a repeated pattern of functional dependency with regard to the total operating revenues in row 4. The data value in cell B4 breaks this repeated pattern of functional dependency in that cell B4 contains the erroneous data value "rei/xz" which is not what would be expected if the functional dependency were followed. Thus, cell B4 may be identified as an erroneous cell whose data value needs to be corrected. It is also possible to "guess" that the cell B4 contains an erroneous data value based on one set of criteria, e.g., that all cells around that cell have numeric values and thus, it is expected that cell B4 should have a numeric value, but then to infer the correct data value for the cell B4 the mechanisms of the illustrative embodiments must discover that cell B4 is part of a functional dependency. If the mechanisms of the illustrative embodiments identify cell B4 as being erroneous by "guessing" that it breaks the criteria for an expected pattern of data values, but it cannot be determined that the cell B4 corresponds to a functional dependency, then the erroneous cell may be identified to a human user via a notification but without a suggested correct data value for the cell B4 since one cannot be determined without discovering the functional dependency of cell B4.

In the present example, the functional dependency associated with cell B4 may be determined from the information gathered from other surrounding cells in a block of cells. For example, looking at the headers for the table and each of the columns, the mechanisms of the illustrative embodiments may determine that the table is a collection of data values for a plurality of calendar years and the structure indicates that each column has a same functional dependency pattern within the column. Thus, by looking at one column in the table, the functional dependencies of corresponding cells in other columns may be identified. As such, the mechanisms of the illustrative embodiments may calculate corrected data values for erroneous cells that make the data values for those erroneous cells match the functional dependency pattern identified from these other columns. For example, looking at cell A4, one can determine that the data value in A4 is the sum of the data values in cells A2 and A3. Thus, the functional dependency for cell A4 is A4=A2+A3. The same functional dependency is found in column C as well such that the functional dependency for cell C4 is C4=C2+C3. This functional dependency may be identified with high confidence in the manner previous described above with regard to FIGS. 1-7.

Extending this pattern of functional dependency to column B means that the functional dependency for cell B4 is that B4=B2+B3. Thus, the corrected data value for cell B4 may be determined by summing the data values from B2 and B3 to obtain the corrected data value 1,860,677. This corrected data value may be calculated and used to replace the erroneous data value in cell B4 in the table structure of the document. This is an example of the first type of erroneous value correction described above.

An example of the second type of erroneous value correction may be if both rows 1 and 2 were eliminated from the diagram in FIG. 8 and instead the erroneous value rei/xz were provided as the input to the dependency function for cell B6. That is, from the other columns, it can be determined that the value in cells in row 6 are the sum of the values in rows 4 and 5 for the same column, e.g., A6=A4+A5 and C6=C4+C5. Thus, extending this dependency function to column B, the functional dependency for cell B6 is that B6=B4+B5 which matches the pattern Output=f( . . . , Cell, . . . ) in the second type of erroneous value correction mentioned above. In such a case, the function is inverted such that Cell=inverse (F, Output) or in this case, B4=B6-B5. Thus, with this example, assuming the value in cell B6 were correct, the correct value for cell B4 would have been 1,977,633−116,956=1,860,677.

Figure 9:
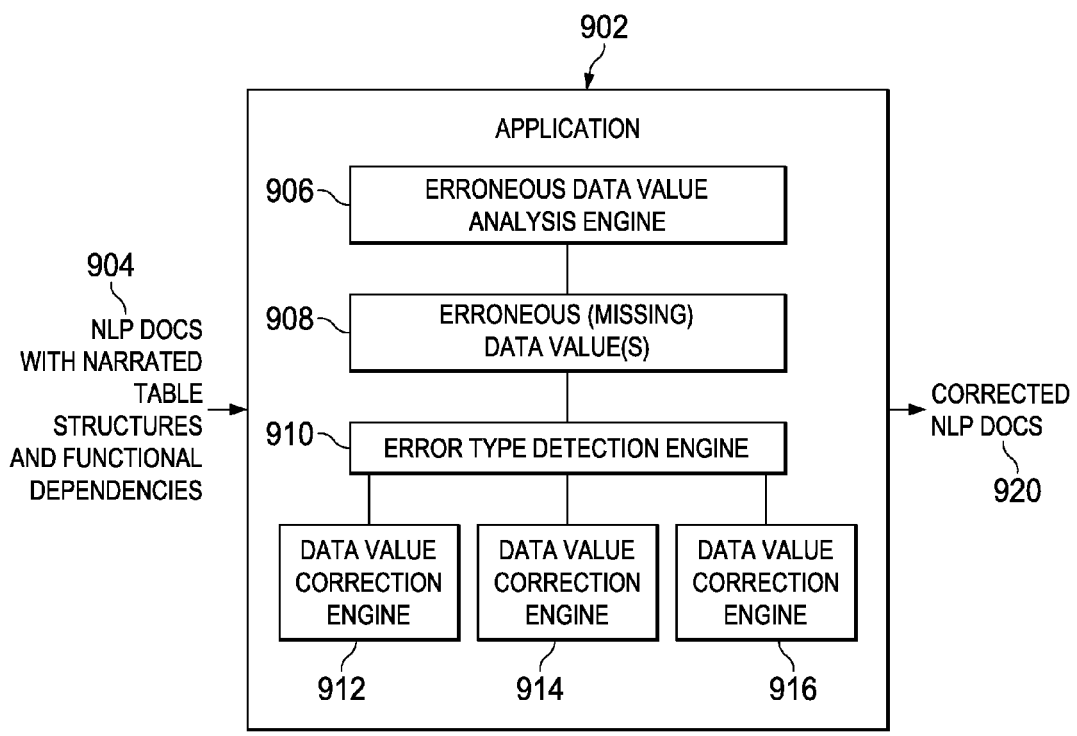
FIG. 9 is an example block diagram of an application for correcting erroneous or missing data values in cells based upon discovered functional relationships in tabular data in accordance with an illustrative embodiment.

FIG. 9 is an example block diagram of an application for correcting erroneous or missing data values in cells based upon discovered functional relationships in tabular data in accordance with an illustrative embodiment. The application shown in FIG. 9 may receive input from the application shown and described above with reference to FIG. 5 or may be integrated with the application of FIG. 5 depending upon the particular desired embodiment. In either case, the application 902 of FIG. 9 can be used, along with application 502, in place of application 105 in FIG. 1. Application 902 receives as input 904 the natural language processed documents with the table structures and functional dependencies as output by application 502 (assuming that application 902 is separate from application 502). The table structures are then analyzed by the erroneous data value analysis engine 906 of the application 902 to identify erroneous data values based on one or more heuristics, identified functional dependency patterns, or the like, to identify erroneous data values 908 within the table structures 904. A functional dependency relationship between the erroneous data value and the other data values involved in the functional dependency is determined by the error type detection engine 910. For example, the error type detection engine 910 may detect whether the erroneous data value is the output of the functional dependency (first error correction type described previously), an input to a functional dependency that is able to be inverted (second error correction type described previously), or an input to a functional dependency that is not able to be inverted (third error correction type described previous).

Data value correction engines 912-916 are utilized, depending upon the detected type of relationship between the erroneous data value and the functional dependency. The data value correction engine 912 may directly calculate the corrected data value for the erroneous cell data value directly from the argument cell data values. The data value correction engine 914 may invert the functional dependency so as to calculate the corrected data value. The data value correction engine 916 may perform an iterative procedure for approximating the corrected data value for the erroneous data value, such as by using a Newton-Raphson, interval bisection, or other suitable iterative algorithm to approximate the correct data value.

The application 902 may then output the natural language processed documents 920 with the table structures having the functional dependencies therein having detected erroneous data values or missing data values corrected. It should be appreciated that while FIG. 9 shows this as being a separate process from the process performed by application 502, these processes may be merged and integrated with one another such that both processes are performed approximately in parallel or virtually simultaneously. Thus, as functional dependencies are detected within the table structures, erroneous data values may also be identified and corrected as necessary based on these determined functional dependencies.

Furthermore, it should be appreciated that while the illustrative embodiments have been described above with regard to primarily numerical data values in cells of a table structure, the illustrative embodiments are not limited to such. To the contrary, as touched upon above, the illustrative embodiments may be utilized to identify functional dependencies of non-numeric data values and correct erroneous or missing non-numerical data values in a similar fashion. For example, a string concatenation dependency function may be identified within a table structure, which is an invertible dependency function.

Figure 10:
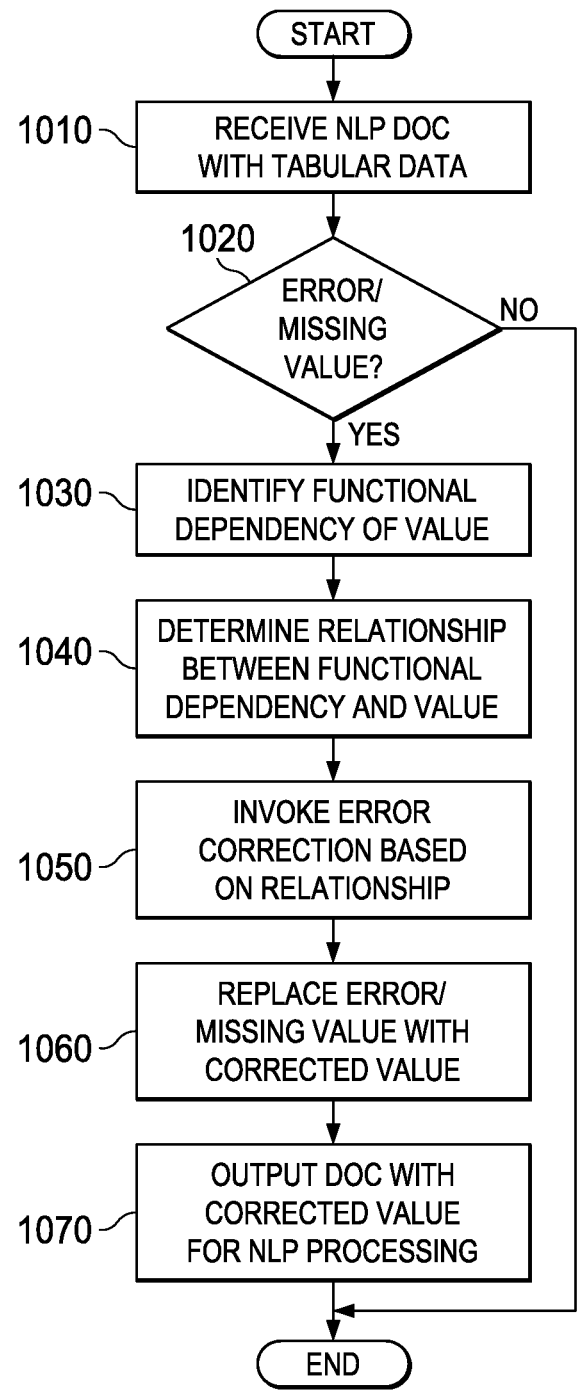
FIG. 10 is a flowchart outlining an example process for correcting erroneous or missing data values in cells based upon discovered functional relationships in tabular data in accordance with one illustrative embodiment.

FIG. 10 is a flowchart outlining an example process for correcting erroneous or missing data values in cells based upon discovered functional relationships in tabular data in accordance with one illustrative embodiment. As shown in FIG. 10, the process starts by receiving a natural language processed document with table structure and functional dependencies identified according to hypotheses and confidence ratings (step 1010) as described in the processes outlined in FIGS. 6 and 7 above. The table structure is analyzed to determine if there are any erroneous or missing data values in cells of the table structure (step 1020). If not, the operation terminates. Otherwise, if an erroneous or missing data value is found, a corresponding functional dependency associated with the cell of the erroneous or missing data value is identified (step 1030). A type of relationship between the erroneous/missing data value and the identified functional dependency is determined (step 1040) and a corresponding error correction engine is invoked (step 1050) to either directly calculate the corrected data value, perform an inversion of the functional dependency to determine the corrected data value, or use an iterative algorithm for approximating the corrected data value. The corrected data value is then used to replace the erroneous/missing data value in the table structure of the natural language processed document (step 1060) which is then output for use by the natural language processing system (step 1070). The operation then terminates.

Thus, the illustrative embodiments provide mechanisms for identifying functional dependencies between portions of table structures in documents being ingested by a natural language processing system. These functional dependencies are further utilized to identify and correct erroneous or missing data values in these portions of table structures. As a result, more complete table structures for natural language processed documents are generated that can be used to perform natural language processing operations, such as question and answer operations in a QA system, such as IBM's Watson™ QA system, or the like.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer readable storage medium having a computer readable program stored therein, wherein the computer readable program, when executed on a computing device, causes the computing device to:

receive a natural language document comprising tabular data;

analyze the tabular data within the natural language document to identify at least one portion of the tabular data comprising an erroneous or missing data value;

determine, for the at least one portion, a functional dependency of the at least one portion of the tabular data on one or more other portions of the tabular data by reference to the natural language document;

determine for the at least one portion, a correct data value for the erroneous or missing data value of the at least one portion of the tabular data based on the determined functional dependency of the at least one portion;

modify the tabular data to replace the erroneous or missing data value with the correct data value and thereby generate a modified tabular data structure; and perform a processing operation on the modified tabular data structure to generate a resulting output.

2. The computer program product of claim 1, wherein the natural language document is an original document of a corpus of information, and wherein the modified tabular data structure is part of a modified document that replaces the original document in the corpus of information.

3. The computer program product of claim 2, wherein the processing operation is a natural language processing operation that is applied to the modified document.

4. The computer program product of claim 3, wherein the natural language processing operation is part of a question answering operation of a Question and Answer (QA) system.

5. The computer program product of claim 1, wherein the natural language document is received as part of at least one of an optical character reading operation, a natural language processing operation, or a user input of the tabular data.

6. The computer program product of claim 1, wherein the computer readable program causes the computing device to analyze the tabular data to identify at least one portion of the tabular data comprising an erroneous or missing data value at least by identifying the at least one portion of the tabular data as comprising an erroneous or missing data value due to an absence of a homogenous cell block criteria for the at least one portion of the tabular data.

7. The computer program product of claim 1, wherein the computer readable program causes the computing device to analyze the tabular data to identify at least one portion of the tabular data comprising an erroneous or missing data value at least by:
  analyzing the at least one portion of the tabular data to determine whether the at least one portion of tabular data comprises a regular structure having a repeated pattern of data or an identifiable dependency between cells in the at least one portion of the tabular data; and
  in response to a regular structure being identified in the at least one portion of the tabular data, performing further analysis to determine if one or more cells within the at least one portion of the tabular data do not conform with the regular structure.

8. The computer program product of claim 1, wherein the computer readable program causes the computing device to determining for the at least one portion, a correct data value for the erroneous or missing data value of the at least one portion of the tabular data based on the functional dependency of the at least one portion by at least one of inverting the functional dependency of the at least one portion to generate the corrected data value or approximating the corrected data value using an iterative procedure.

9. The computer program product of claim 1, wherein the computer readable program causes the computing device to analyze the tabular data to identify at least one portion of the tabular data comprising an erroneous or missing data value at least by identifying the at least one portion of the tabular data as comprising an erroneous or missing data value due to a discrepancy between a data value type specified by information in a header of one or more columns or rows associated with the at least one portion of the tabular data and the erroneous or missing data value.

10. The computer program product of claim 1, wherein the computer readable program further causes the computing device to:
  output a notification to a user indicating the portion of the tabular data comprising the erroneous or missing data value and the corrected data value as a suggested replacement for the erroneous or missing data value, wherein the modifying of the tabular data is performed in response to receiving user input approving the corrected data value for replacing the erroneous or missing data value.

11. An apparatus comprising:
  a processor; and
  a memory coupled to the processor, wherein the memory comprises instructions which, when executed by the processor, cause the processor to:
  receive a natural language document comprising tabular data;
  analyze the tabular data within the natural language document to identify at least one portion of the tabular data comprising an erroneous or missing data value;
  determine, for the at least one portion, a functional dependency of the at least one portion of the tabular data on one or more other portions of the tabular data by reference to the natural language document;
  determine for the at least one portion, a correct data value for the erroneous or missing data value of the at least one portion of the tabular data based on the determined functional dependency of the at least one portion;
  modify the tabular data to replace the erroneous or missing data value with the correct data value and thereby generate a modified tabular data structure; and
  perform a processing operation on the modified tabular data structure to generate a resulting output.

12. The apparatus of claim 11, wherein the natural language document is an original document of a corpus of information, and wherein the modified tabular data structure is part of a modified document that replaces the original document in the corpus of information.

13. The apparatus of claim 12, wherein the processing operation is a natural language processing operation that is applied to the modified document.

14. The apparatus of claim 13, wherein the natural language processing operation is part of a question answering operation of a Question and Answer (QA) system.

15. The apparatus of claim 11, wherein the natural language document is received as part of at least one of an optical character reading operation, a natural language processing operation, or a user input of the tabular data.

16. The apparatus of claim 11, wherein the instructions cause the processor to analyze the tabular data to identify at least one portion of the tabular data comprising an erroneous or missing data value at least by identifying the at least one portion of the tabular data as comprising an erroneous or missing data value due to an absence of a homogenous cell block criteria for the at least one portion of the tabular data.

17. The apparatus of claim 11, wherein the instructions cause the processor to analyze the tabular data to identify at least one portion of the tabular data comprising an erroneous or missing data value at least by:
  analyzing the at least one portion of the tabular data to determine whether the at least one portion of tabular data comprises a regular structure having a repeated pattern of data or an identifiable dependency between cells in the at least one portion of the tabular data; and
  in response to a regular structure being identified in the at least one portion of the tabular data, performing further analysis to determine if one or more cells within the at least one portion of the tabular data do not conform with the regular structure.

18. The apparatus of claim 11, wherein the instructions cause the processor to determining for the at least one portion, a correct data value for the erroneous or missing data value of the at least one portion of the tabular data based on the functional dependency of the at least one portion by at least one of inverting the functional dependency of the at least one portion to generate the corrected data value or approximating the corrected data value using an iterative procedure.

19. The apparatus of claim 11, wherein the instructions cause the processor to analyze the tabular data to identify at least one portion of the tabular data comprising an erroneous or missing data value at least by identifying the at least one portion of the tabular data as comprising an erroneous or missing data value due to a discrepancy between a data value type specified by information in a header of one or more columns or rows associated with the at least one portion of the tabular data and the erroneous or missing data value.

20. The apparatus of claim 11, wherein the instructions cause the processor to:
output a notification to a user indicating the portion of the tabular data comprising the erroneous or missing data value and the corrected data value as a suggested replacement for the erroneous or missing data value, wherein the modifying of the tabular data is performed in response to receiving user input approving the corrected data value for replacing the erroneous or missing data value.

* * * * *